United States Patent [19]
Thompson, Sr.

[11] 3,797,316
[45] Mar. 19, 1974

[54] BELLOWS TEMPERATURE BULB SENSOR

[75] Inventor: Elliott R. Thompson, Sr., Huntsburg, Ohio

[73] Assignee: Bailey Meter Company, Wickliffe, Ohio

[22] Filed: Dec. 22, 1971

[21] Appl. No.: 210,755

[52] U.S. Cl. ................. 73/368.4, 73/368.7, 92/36, 200/83 D
[51] Int. Cl. ............................................. G01k 5/42
[58] Field of Search ............ 73/368.4, 368.7, 368.1; 200/83 D; 62/23; 92/45, 46, 35–37

[56] References Cited
UNITED STATES PATENTS

| | | | |
|---|---|---|---|
| 1,289,435 | 12/1918 | Fulton | 92/36 |
| 2,316,611 | 4/1943 | Neuse | 73/368.7 X |
| 3,597,977 | 8/1971 | Zierak | 73/368.7 |
| 3,027,730 | 4/1962 | Bauerlein | 73/368.3 |
| 2,058,104 | 10/1936 | Piers | 60/23 |
| 1,070,027 | 8/1913 | Fitts | 73/368.7 |
| 3,461,725 | 8/1969 | Gardiner et al. | 73/368.7 UX |

FOREIGN PATENTS OR APPLICATIONS

| | | | |
|---|---|---|---|
| 480,636 | 8/1929 | Germany | 92/35 |
| 387,902 | 2/1933 | Great Britain | 92/35 |

Primary Examiner—Richard C. Queisser
Assistant Examiner—Daniel M. Yasich
Attorney, Agent, or Firm—Joseph M. Maguire; G. L. Kensinger

[57] ABSTRACT

A device providing a large heat transfer area for ambient temperature and a small volume of heat sensitive fluid within the bulb. Bulbs with rigid corrugated walls or thin-wall bellows with reinforced convolutions have substantially equal heat-transfer areas exposed to the ambient temperature outside the bulb and to the heat sensitive fluid inside the bulb. Concentric, corrugated or bellows surfaces are used to form the sensing bulb between them and to increase heat transfer area. Concentric bellows are reinforced by a spider assembly allowing flow of sensed ambient to the inside bellows surface.

4 Claims, 7 Drawing Figures

INVENTOR.
ELLIOT R. THOMPSON SR.
BY Joseph L. Brzuszek
ATTORNEY

INVENTOR.
ELLIOT R. THOMPSON SR.
BY Joseph L. Brzuszek
ATTORNEY

INVENTOR.
ELLIOT R. THOMPSON SR.
BY
Joseph L. Brzuszek
ATTORNEY

BELLOWS TEMPERATURE BULB SENSOR

BACKGROUND OF THE INVENTION

1. Field of the Invention

This invention relates to temperature sensors in general and more specifically to temperature sensitive, fluid filled, sensing bulbs providing a large heat transfer rate from ambient temperature to the sensor's temperature sensitive fluid by the use of large sensing bulb areas and small sensing fluid volumes. 2. Description of the Prior Art Most of the temperature sensing devices presently available include a cylindrically shaped sensing bulb filled with a temperature sensitive fluid. As the temperature in the area of this bulb is elevated, the fluid enclosed by the sensing bulb increases in volume and produces an increased sensing bulb pressure. To provide a sensor that will withstand this increased pressure without bursting or deforming, the bulb walls must be made of a thickness sufficient to provide the needed strength and rigidity. The result is a sensor that is slow-reacting to temperature changes since the temperature of the sensor ambient atmosphere must be transmitted through the sensor wall thickness before the enclosed fluid will react to it. In certain situations of high frequency ambient temperature fluctuation, the transient response of the sensor bulb and enclosed fluid may be slower than the actual ambient temperature fluctuation. The sensing device is then incapable of following these fluctuations and produces a response that is some average of these fluctuations.

Attempts have been made to increase the sensitivity of such cylindrical sensor bulbs by adding a series of circular rings or fins around the external length of the bulb. This measure, although somewhat successful, nevertheless has some basic weaknesses. The strength of the bulb must still be provided by the bulb walls which must be of a sufficient thickness. Although a larger area is exposed to the bulb ambient atmosphere, the area exposed to the enclosed expansive fluid is the same as in the ordinary cylindrical bulb described previously. Also the rings providing the increased area to ambient atmosphere are somewhat self-defeating since in the region of each ring the wall thickness is increased. Since conductive heat transfer is directly proportional to exposed area and inversely proportional to wall thickness whenever one increases the area by adding rings, one also decreases heat transfer by the additional thickness supplied by the fins. Bulbs which have fins extending into the temperature sensitive fluid have been similarly ineffective.

Reinforced bellows temperature sensors are disclosed in U.S. Pat. No. 3,597,977 granted on Aug. 10, 1971. However, the stiffening is limited to attaching of the bellows between two stationary end plates without providing any stiffening to the individual convolutions of the bellows. This limits the temperature sensor to bellows thicknesses and configurations which provide sufficient internal strength, to eliminate any possible expansion of the individual convolutions. Furthermore, the heat transfer area is limited entirely to the peripheral external surface of the bellows sensor without any disclosure providing for a heat transfer area internal of the peripheral external surface.

The present invention contemplates new and improved devices which overcome all of the above referred problems and others and provides a simple approach for maximizing surface to volume ratios of temperature bulb sensors by maximizing exposed surface area and minimizing volume of sensor fluid therewithin.

SUMMARY OF THE INVENTION

In accordance with the present invention there is provided a temperature bulb sensor having an increased surface area and decreased sensing fluid volume over an equivalent size cylindrical, finned or bellows bulb sensor. This results in increased heat transfer rates to the temperature expansive fluid enclosed in the device and consequently improved sensitivity and reaction time.

The increased area and decreased sensing fluid volume is provided by the use of a first enclosing surface and a second enclosing surface, internal of the first surface, forming a sensor bulb between them which provides a second heat transfer area internal to the sensor bulb. This concept is implemented in a number of ways including the use of two rigid corrugated enclosing surfaces, one inside of the other; a bellows-like enclosing surface with positive stiffening means for each convolution with an internal open ended cylinder and two enclosing surfaces, one inside of the other, stiffened with a spider assembly.

Two rigid corrugated enclosing surfaces are made to form a chamber of small pressure invariant volume. This volume is filled with a temperature expansive fluid which is in contact with the areas of both corrugated surfaces. The opposite areas of the corrugated surfaces are in contact with the temperature being sensed. Due to the inherent strength and high heat transfer area of the two corrugated surface configurations, the heat transfer area of the two corrugated surfaces is greater than that of an equivalent single surface temperature sensor. Furthermore, the two corrugated surfaces provide less volume of temperature expansive fluid per sensing area than even a deep convolution single bellows sensor. These factors allow faster heat transfer to the temperature expansive fluid and increases sensitivity and reaction time of this fluid to a temperature change outside the sensor.

The sensor is provided with a means for communicating the reaction of the enclosed fluid externally of the sensor body. The above means include a capillary tube the first end of which is connected to the sensor body. The second end of the capillary tube may be connected to a means for translating the reaction of the expansive fluid into the movement of some element or to provide a force. The translating means includes a Bourdon tube, having a pivoted pointer arm coupled to it for indicating the temperature, or a motion balance controller to control a process in response to the sensed temperature. Similarly, the force may be used in a force balance controller.

Further in accordance with the invention a bellows-like enclosing surface and an open ended cylinder internal thereto are made to form a sensor bulb which has positive means for stiffening each bellows convolution to assure it does not substantially expand or contract from a difference in internal and external pressure which may be due to the expansion of the expansive fluid inside the sensor bulb. It will be appreciated that the bellows capsule is thus stiffened to allow the use of extremely thin wall bellows convolutions which would deform unless each individual convolution were reinforced and which are conducive to improved heat transfer rates between the outside surface of the sensor bulb and the expansive fluid inside the sensor bulb. The open ended cylinder provides further heat transfer area. The bellows convolutions allow the expansive fluid to fill the inside of each bellows convolution and thereby to provide a substantially identical contact area for the temperature sensed and the expansive fluid. Obviously, the bellows and internal open ended cylinder provide a larger heat transfer area than an equivalent single bellows sensor bulb. The sensor bulb is also provided with means for communicating externally the reaction of the expansive fluid in the capsule.

The convolutions of the bellows capsule may be stiffened in a number of way including the use of a stiffening bar to which the plurality of convolutions are mechanically affixed. Similarly rigid spacers may be provided between each convolution or extended finned surfaces of each convolution may be extended through holes in the stiffening bar.

Further in accordance with the invention, a first and a second enclosing surface, one inside the other, form a sensing bulb wherein the internal enclosing surface as well as the external surface are open to the temperature sensed. Both the surfaces are held stiffened to allow the flow of the ambient temperature through the internal volume of the sensing bulb. The stiffening is accomplished by the use of a support rod internal to the two enclosing surfaces which supports the ends of the two surfaces by spider assemblies. These spider assemblies allow the sensed atmosphere to be communicated through the volume of the internal bellows. The previous methods of reinforcing each individual convolution may also be used.

BRIEF DESCRIPTION OF THE DRAWINGS

FIG. 4b is a cross-sectional view of the device in FIG. 4a taken along section 4b—4b in FIG. 4a.

DESCRIPTION OF THE PREFERRED EMBODIMENTS

Figure 1:
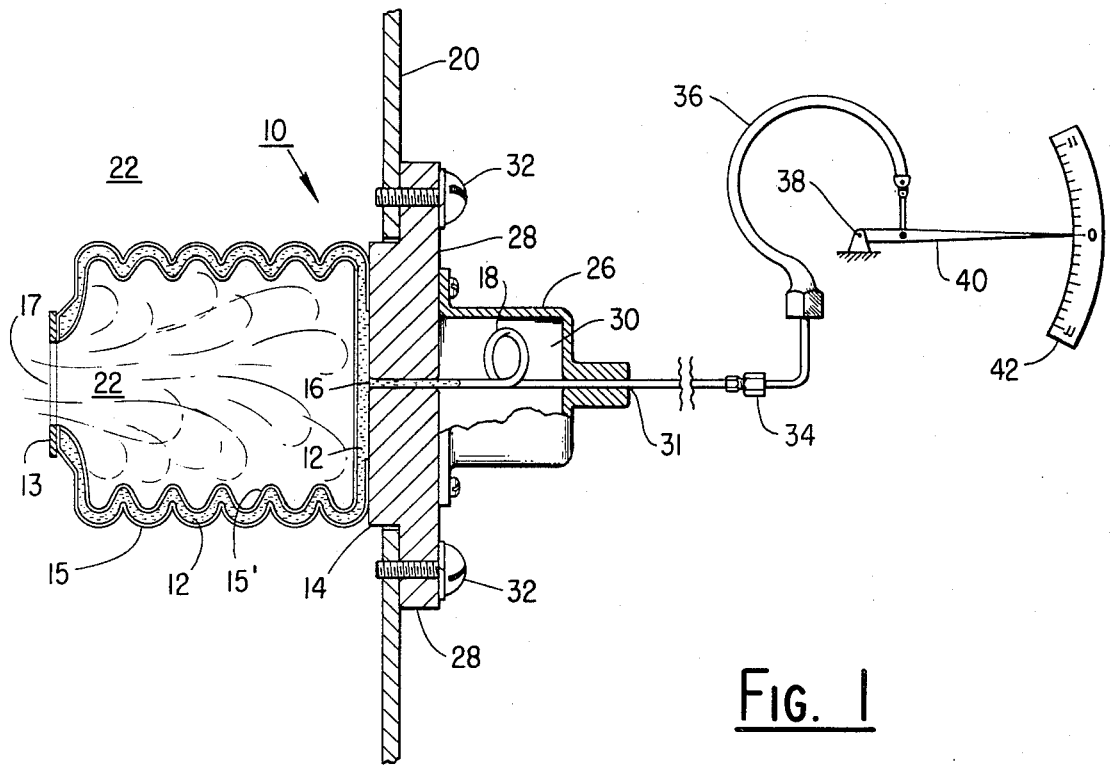
FIG. 1 is a side view partially in cross section of a two corrugated surface temperature sensing device coupled to a Bourdon tube temperature indicator.

Referring now to the drawings wherein the showings are for the purposes of illustrating the preferred embodiment of the invention only and not for the purpose of limiting same, FIG. 1 shows a rigid double corrugated surface sensor assembly 10 with a corrugated external surface 15 and a corrugated internal surface 15' located in a sensed atmosphere 22. The sensor 10 is filled with a temperature expansive fluid 12 which may be either a liquid or a gas. The corrugated surface 15 is affixed to a sensor mounting plate 14 which extends through a mounting wall 20 into the sensed atmosphere 22. The corrugated internal surface 15' is located internally of the corrugated surface 15 and is also open to the sensed atmosphere 22 through an inlet 17 in the annular end ring 13 which seals the ends of the corrugated surfaces 15, 15'.

The mounting plate 14 has a capillary tube inlet 16 communicating with a capillary tube 18. The capillary tube 18 extends through the plate 14 and communicates with the temperature expansive fluid 12. The sensor assembly 10 is mounted to the wall 20 by mounting screws 32 extending through mounting flanges 28. Extending from the mounting flanges 28 is a capillary tube housing 26 forming a capillary tube compartment 30. The capillary tube 18 extends into the compartment 30 and exits therefrom through an aperture 31. THe capillary tube 18 is connected to a Bourdon tube 36 by a connector 34. The Bourdon tube 36 is coupled to an indicator 40 pivoted at a pivot point 38 to indicate the temperature sensed by the sensor assembly 10 on a readout scale 42.

In operation, the temperature of the sensed atmosphere 22 is communicated to the expansive fluid 12 by heat conduction through the walls of the corrugated surfaces 15, 15'. If the temperature of the expensive fluid increases, the fluid pressure also increases. The corrugated surfaces 15, 15' are naturally rigid and thus no volume increase is visible in response to the increased pressure. This increased pressure is communicated by the connecting capillary tube 18 to the Bourdon tube 36 which uncoils with increased pressure and thereby actuates the indicator 40 to the appropriate indicating position on the readout scale 42 corresponding to the temperature of the expansive fluid 12. With decreasing fluid 12 temperature, the pressure in the system decreases and the Bourdon tube 36 coils up to again have the indicator show the corresponding fluid temperature on the readout scale 42.

Figure 2:
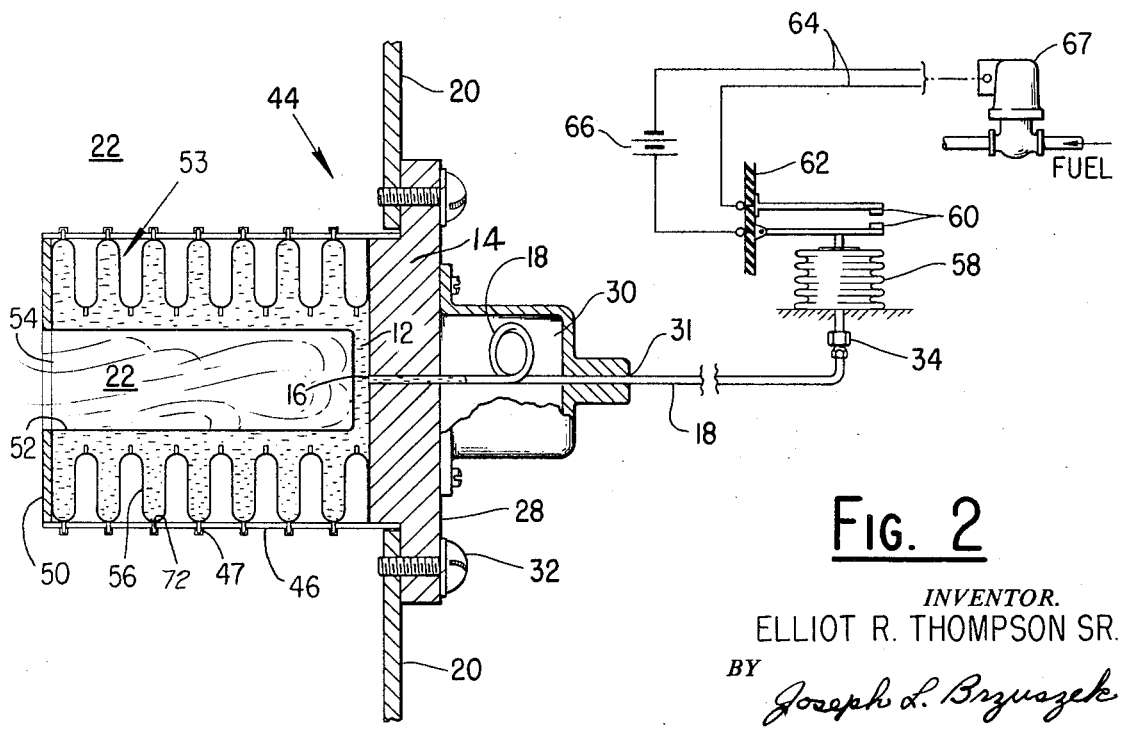
FIG. 2 is a side view of a stiffened bellows temperature sensing device with an internal open ended cylinder and coupled to an expansive bellows used for actuating an electrical switch.

Referring now to FIG. 2, a reinforced bellows and open end cylinder sensor assembly 44 has a multiconvolution bellows 53 and a cylinder 52 having an open end 54 located in the sensed atmosphere 22. One end of the bellows shaped member 53 is affixed to the mounting plate 14 and the other end is affixed to annular end plate 50. The sensor 44 is filled with temperature expansive fluid 12 which is in contact with the inside wall of each bellows convolution 56 and the wall of the cylinder 52 facing the fluid.

Each bellows 53 convolution is reinforced by attachment to a reinforcing bar 46. This bar may appear either inside or outside the sensor bulb 53 and may have each convolution welded to it. The number of such bars will vary depending on the wall thickness of the bellows and the amount of reinforcing desired.

Figure 3A:
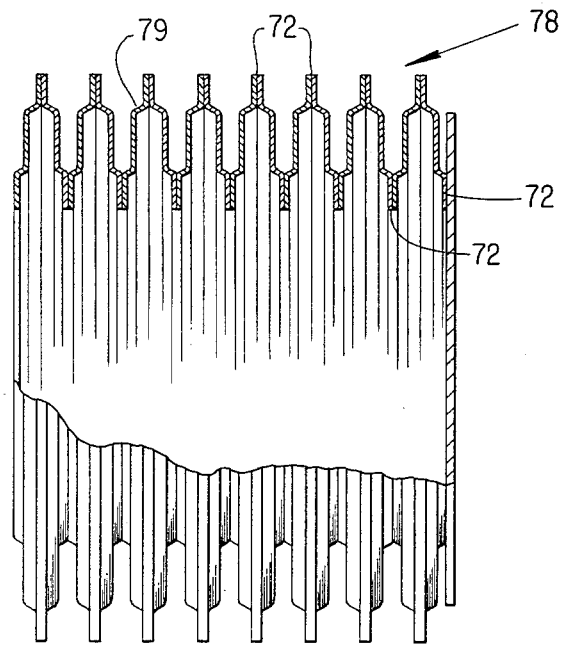
FIG. 3a, b, c are cross-sectional views of various bellows configurations having individually stiffened convolutions.

Using a welded bellows 78, as shown in FIG. 3a, having protruding weld points 72 as the sensor bulb 53 (FIG. 2) allows each convolution to be reinforced without the need for welding. The reinforcing rod 46 (FIG. 2) is made to contain a plurality of apertures 47 through which the weld points 72 of the sensor bulb 53 project and are mechanically captured therein.

The sensor assembly 44 is mounted to the mounting wall 20 by the means and in the manner previously described in reference to FIG. 1. The capillary tube 18 in this embodiment communicates with the fluid 12 through inlet 16 and is connected to a flexible bellows 58 by the connector 34. This flexible bellows 58 rests against a pair of electrical contacts 60 mounted on an insulating contact mount 62. Electrical lead wires 64 are connected to the electrical contacts 60 and have an electrical power source 66 for powering a valve 67 which is used to control fuel flow for heating the sensed atmosphere 22. This arrangement thereby controls the temperature of the sensed atmosphere 22.

In operation, the temperature of the sensed atmosphere 22 is communicated to the expansive fluid 12 by heat transfer through the convolutions 56 of the sensor bulb 53 and the area of the cylinder 52. Heat transfer is facilitated by the thin walls and the large area of the convolutions 56 as well as the cylinder 52 area open to the atmosphere 22 through the inlet 54. As the temperature of the fluid 12 increases, the pressure inside the assembly 44 also increases. Since the individual bellows 56 are stiffened by the reinforcing bar 46, the volume of assembly 44 remains substantially unchanged. The fluid pressure is transmitted through the inlet 16 to the capillary tube 18 and therefrom to the flexible bellows 58. The bellows 58 is not stiffened and will expand or supply force with increased fluid pressure. As the bellows 58 expands, it pushes the contacts 60 together thereby making an electrical circuit path and actuating the normally open valve 67 to close and terminate fuel flow. Without heat being supplied to the sensed atmosphere 22, its temperature will fall due to various heat losses as will the temperature of the expansive fluid 12 in resposne thereto. A decreased pressure will result in the assembly 44 and similarly in the flexible bellows 58 which will contract and allow the electrical contacts 60 to open. This will resume fuel flow from the valve 67 and allow the temperature of the atmosphere 22 to rise. The operation described has been a simple "on-off" control. It will be understood that automatic control utilizing proportional, integral, and derivative modes are also easily accomplished by having the capillary tube 18 serve as the input to an automatic controller.

The bellows 53 of the assembly 44 may be constructed of various convolution configurations including the ones shown in FIG. 3, all of which are capable of accommodating an internal open ended cylinder 52.

Referring to FIG 3a, the welded bellows 78 has adjacent convolutions 79 welded to each other at the weld points 72. The extended weld and contact between convolutions allows for a sturdy bellows construction. It will be appreciated that the welds are of a material having heat transfer properties similar to the bellows material or are accomplished by joining the parent material.

Figure 3B:
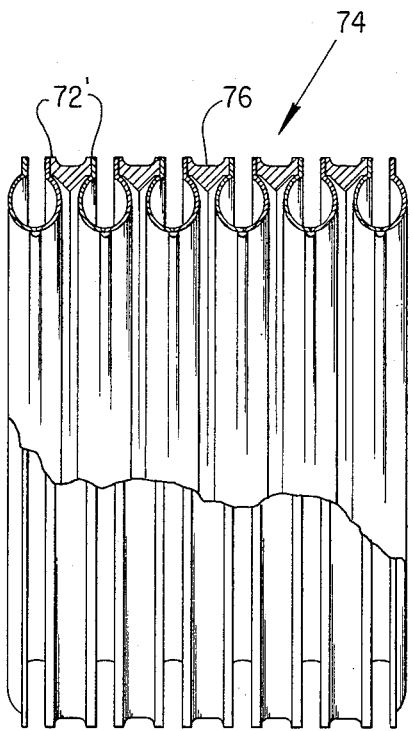

Referring to FIG. 3b a spaced bellows 74 has a spacer 76 included between each convolution to which adjacent convolutions are similarly welded at weld points 72'. This spacer 76 provides rigidity to the bellows 74 and prevents the convolutions from collapsing on to each other during overpressure conditions. The spacers 76 fit into the apertures 47 of bar 46.

Figure 3C:
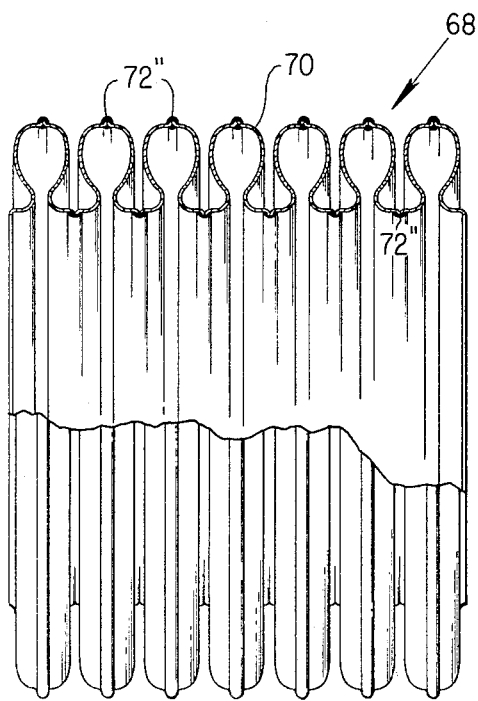

Referring to FIG. 3c an integral spacer bellows 68 has convolutions 70 which have an integral spacer due to their configuration. The convolutions are again similarly welded together at the weld points 72''. This configuration eliminates the need for the spacer 76 while maintaining the same convolution area as in FIG. 3b. The weld points 72'' again fit into the aperture 47.

A resting bellows as described in U.S. Pat. No. 2,925,829 issed to E. R. Thompson on Feb. 23, 1960, may also be used.

Figure 4B:
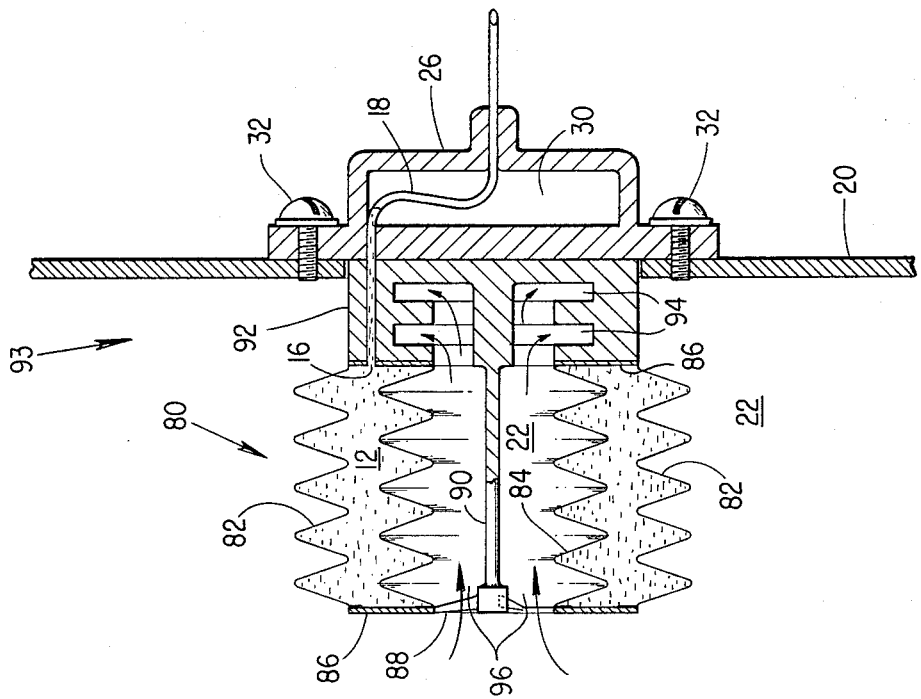
Figure 4A:
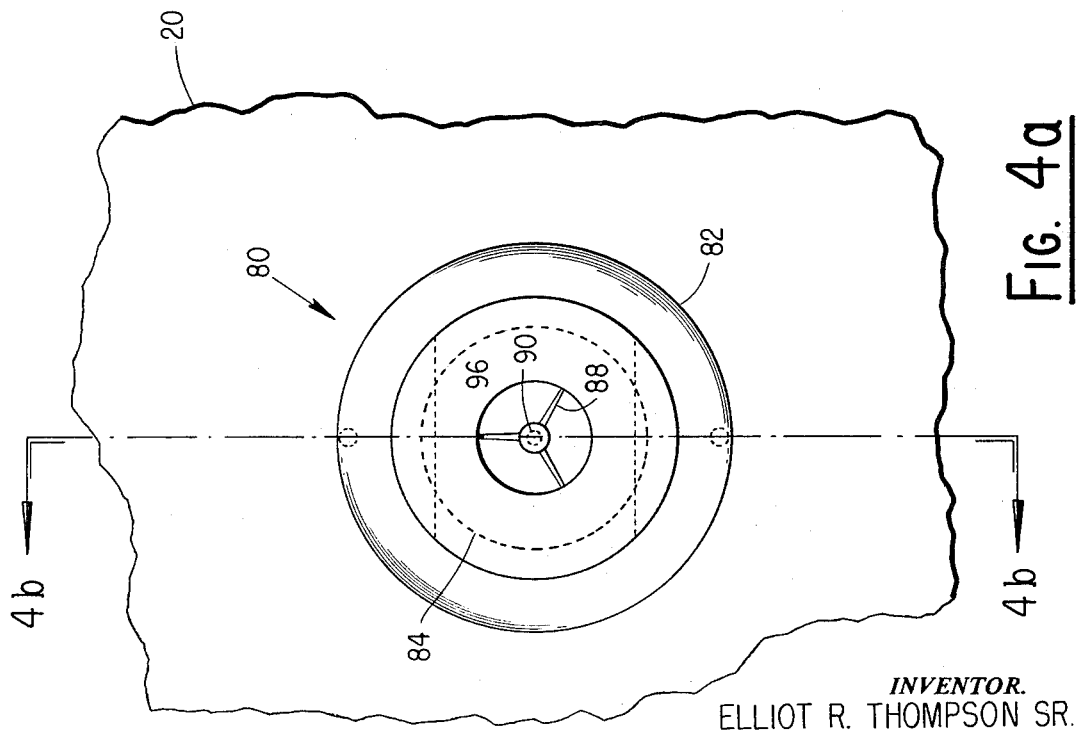
FIG. 4a is a plan view of a two surface temperature sensing device.

Referring now to FIGS. 4, a and b, a concentric two bellows assembly 80 has an external bellows 82 with an internal bellows 84 concentric with and internal to the external bellows 82. Annular end plates 86 enclose a volume between the internal and external bellows 84, 82 which is filled with temperature expansive fluid 12. The capillary tube 18 communicates with the fluid 12 enclosed by the bellows assembly 80. A support rod 90 is located in the center of the bellows assembly 80. The rod 90 is connected to the end plates 86 through support spiders 88. The supported bellows assembly 80 is mounted to a back spacer 92 which is hollow and has outlet slots 94 located around its periphery. The sensor assembly 93 is mounted to the mounting wall 20 by the means and structure previously described in reference to FIG. 1. The structure shown in FIG. 4b for the back spacer 92 is also viable for the FIGS. 1–3 embodiments. The capillary tube may be connected to a Bourdon tube for indicating, a flexible bellows for control or any other indicating or control means.

In operation the temperature of the sensed atmosphere 22 is communicated to the expansive fluid 12 through the outside wall of the external bellows 82 and the inside wall of the internal bellows 84. The atmosphere 22 communicates with the internal bellows 84 by way of entering at an atmosphere inlet 96 and exiting through the atmosphere outlets 94. Practically twice the area is presented for heat transfer as in a single bellows sensor. The walls of both bellows 82, 84 are made thin since the assembly 80 is stiffened by the support rod 90 and spider 88. The reaction of the fluid 12 to temperature changes in the atmosphere 22 is thus extremely fast. With increased temperature, the fluid expands and the pressure of the sensor assembly 93 increases. The volume of the concentric bellows assembly, however, remains substantially constant due to the constraint imposed by the support rod. This increased pressure is communicated externally to the assembly 93 by the capillary tube 18. Similarly with decreased temperature, the pressure of the sensor assembly decreases. It will be understood that the bellows 82, 84 could be replaced with corrugated or tubular surfaces which require no stiffening.

Certain modifications will be obvious to those skilled in the art. As an example of such an obvious modification the support bar 46 can be made to include protrusions which would fit between each convolution of a bellows to stiffen it thereby. Similarly the support rod 90 can be replaced with support bars 46 for the bellows 82, 84. It is intended that these modifications be also included in this application.

What I claim as new and desire to secure by Letters Patent of the United States is:

1. A temperature sensing device comprising:
   a mounting base;
   a first body having two ends with a bellows-like surface therebetween and with one end mounted to said base;
   a hollow cylinder body having one end closed and one end open and the closed end projecting into said first body with clearance from said bellows-like surfaces and the mounting base, said hollow body extending to the second end of said first body;

an annular member sealed between said cylinder body and said first body to form a sensing bulb between said bodies, said base and said annular member and to permit free communication of a fluid with the inner surface of said hollow body; at least one stiffening bar means mechanically affixed to a point on each of the convolutions of said sensing bulb to substantially eliminate expansion or contraction of said sensing bulb from a difference in internal and external pressures;

a temperature expansive fluid filling and sensing bulb and in contact with the inside walls of said bellows-like surface and said cylinder body;

means for communicating, externally to said sensing bulb, the reaction of said temperature expansive fluid to any temperature to which the outside surface of said sensing bulb is subjected; and indicating means associated with said communicating means and responsive to the reaction of said temperature expansive fluid for registering said temperature being sensed.

2. A temperature sensing device as set forth in claim 1 wherein said at least one stiffening bar means has a plurality of apertures in which a plurality of the convolutions of said bellows-like surface are mechanically affixed.

3. A temperature sensing device as set forth in claim 1 including a second stiffening bar means attached to the convolutions of said sensing bulb surface opposite that of said first stiffening bar means.

4. A temperature sensing device as set forth in claim 3 wherein said communicating means includes a capillary tube, the first end of which is connected to said sensing bulb so as to allow the passage of said expansive fluid, and a movable bellows connected to the second end of said capillary tube, said movable bellows producing motion or force in response to the amount of said expandable fluid forced to said movable bellows from said sensing bulb.

* * * * *